Nov. 26, 1929.　　　W. M. EDDINS　　　1,737,362
TRIM SAW
Filed Sept. 7, 1927　　　2 Sheets-Sheet 1
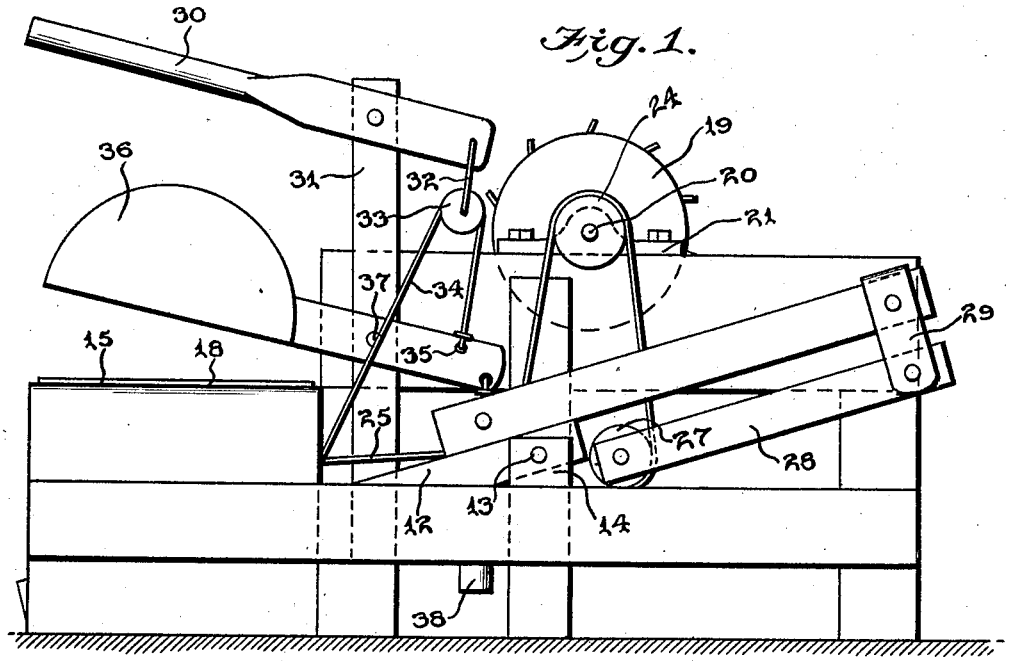
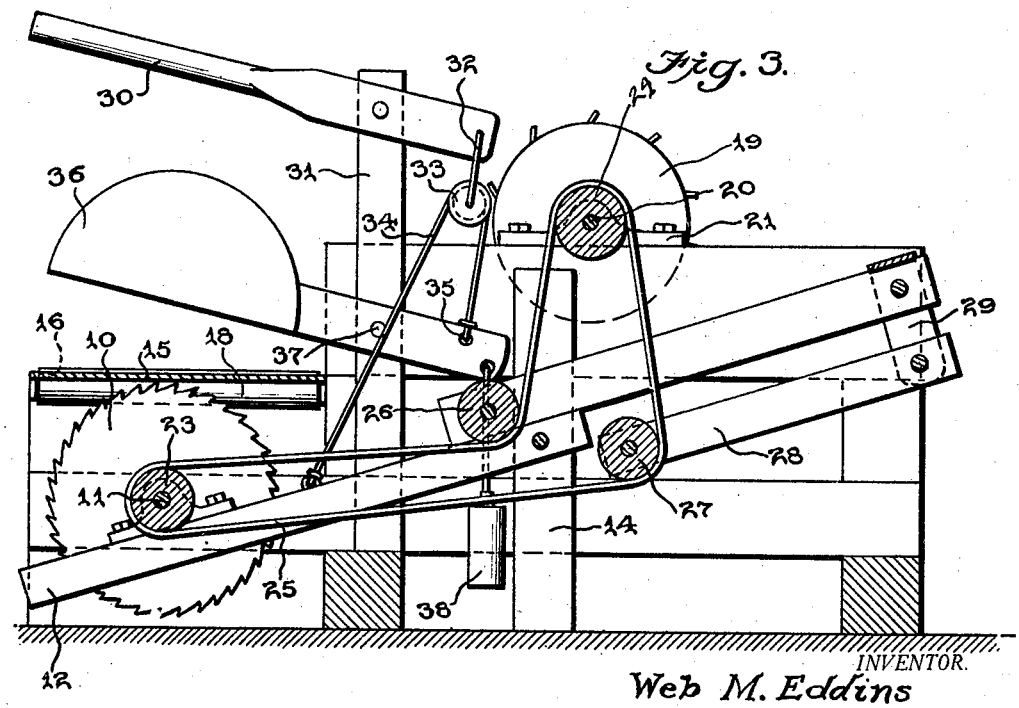
INVENTOR.
Web M. Eddins
BY
ATTORNEY.

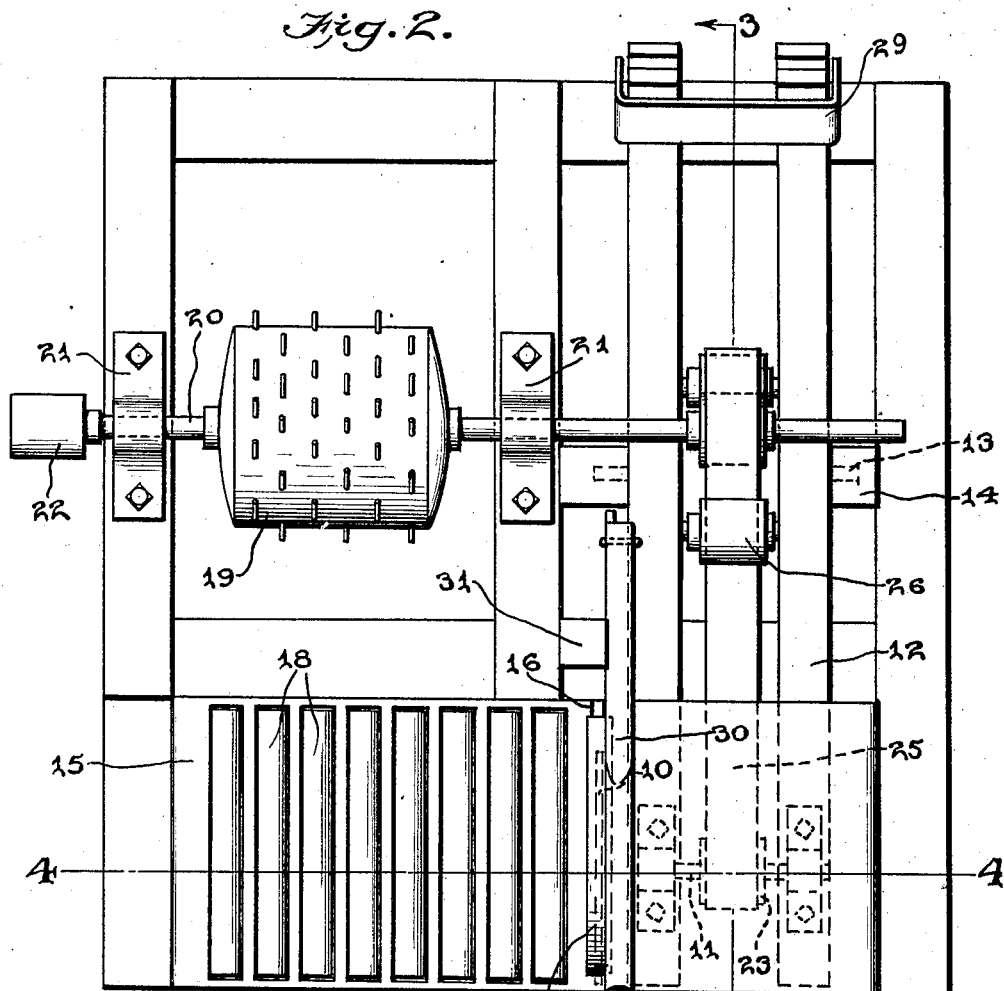
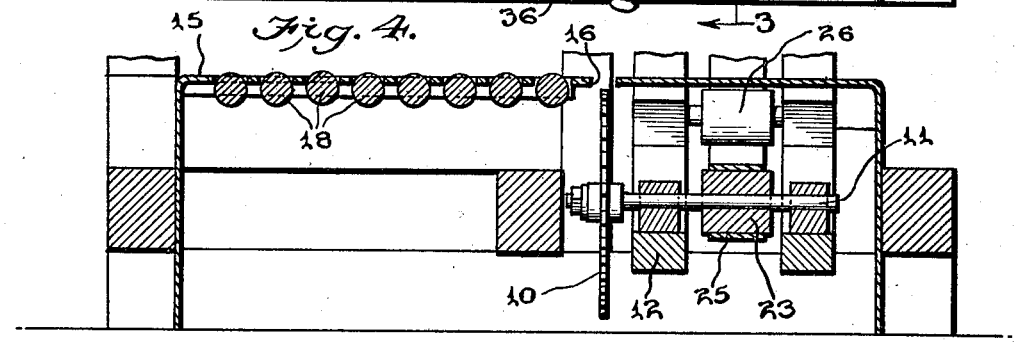

Patented Nov. 26, 1929

1,737,362

UNITED STATES PATENT OFFICE

WEB M. EDDINS, OF BARNETT, MISSISSIPPI

TRIM SAW

Application filed September 7, 1927. Serial No. 218,089.

The object of the invention is to provide a trim saw to be constructed as part of an apparatus comprising a slab kicker for the disposition of the waste ends of boards, whereby the saw and kicker may be driven by a common actuating means; to provide a construction in which the saw will be moved toward the work but in a vertical path, so that when not actually in performance of the trimming operation, it will be disposed below the work-carrying bed; to provide a saw guard operable in common with the means for effecting bodily movement of the saw, so that the saw will always be covered or shielded during the trimming operation, or at any time the saw may project above the work-supporting bed; and to provide an apparatus embodying these several features which should be simple in construction and therefore susceptible of cheap manufacture and low marketing cost.

With this object in view, the invention consists in a construction and combination of parts of which a preferred embodiment is illustrated in the accompanying drawings, wherein:

Figure 1 is a side elevational view of the invention.

Figure 2 is a top plan view.

Figures 3 and 4 are respectively sectional views on the planes indicated by the lines 3—3 and 4—4 of Figure 2.

The saw 10 which is of circular form is mounted for rotation on its own axis as well as for bodily movement vertically, being carried on a shaft 11 journaled in bearings at one end of a rocking or oscillatory frame 12, the latter having trunnions 13 seated in bearings of the main frame 14. The saw 10 is disposed normally below the work table 15 on which the lumber to be cut or trimmed is carried, passing through a slot 16 in the table when being elevated to cut or trim the board to be operated upon. The table 15 spans the whole of the main frame 14 and that section above the saw-carrying end of the oscillatory frame is a plane surface, the section 18 being provided with spaced rollers on which the waste pieces removed from the different boards may be readily shifted laterally away from the saw, so that they may be readily grasped and cast on to the slab kicker 19 which is a peripherally toothed drum carried by a shaft 20 which is journaled in bearings 21 of the main frame.

The shaft 20 is provided with a pulley 22 for belted connection with an appropriate driving motor.

The shaft 20 is operatively connected with the saw for rotation of the latter on its own axis and to this end the shaft 11 is provided with a pulley 23 and the shaft 20 with a pulley 24, a belt 25 being trained over these two pulleys as well as over an idler pulley 26 rotatably mounted in the rock frame 12 at an intermediate point and over a pulley 27 rotatably mounted in the free end of a swinging belt tightener frame 28, the latter having a pivotal connection with the yoke 29 mounted on the rock frame 12 at the end remote from the saw. The belt tightener frame is disposed on the under side of the rock frame and the gravital tendency of the free end of the latter serves to keep the belt 25 taut, so that despite the position of the rock frame on its trunnions, there will always be sufficient frictional engagement of the belt with the various pulleys to impart turning movement of the saw as long as the shaft 20 is rotated.

The trunnions of the rock frame are so positioned that gravity tends to lower the saw-carrying end of the latter and unless this end be raised, the rock frame will be normally disposed with the saw below the work table. Thus the boards to be trimmed may be readily positioned on the table for engagement with the saw at the desired point on the boards and the saw-carrying or forward end of the rock frame elevated, when the boards will be severed at the desired point due to the axial rotation of the saw, the waste ends severed then being cast on to the kicker by which they are thrown to some remote point.

The elevation of the forward end of the frame may be effected by hand actuated or foot actuated means, the illustrated embodiment disclosing the former consisting of a hand lever 30 pivotally mounted at the upper end of the post 31 carried by the main frame 14. The resistance arm of this lever is provided with a hanger 32 carrying a sheave pulley 33 over which a cable 34 is trained, one end being anchored to the rock frame 12 and the other and to a tail extension 35 of a saw guard 36, the latter being pivotally mounted on the post 31 by means of a pivot stud 37 passing through the tail extension, the remote end of which carries a counterweight 38. The guard 36 is in the form of a cap or shield which will completely enclose any portion of the saw 10 projecting above the work table when the rock frame is elevated but with the lever 30 free, this guard will be elevated by the counterweight 38, since the cable 34 will then be not under tension. Thus the guard is out of position and will not interfere with the placing of boards on the work table above the slot 16. After the placement of the boards, however, the saw has to be elevated to sever the same and the depression of the force arm of the lever will first effect a tension on the cable and thereafter rock the guard down into contact with the face of the board, since the forward end of the rock frame overbalances the counterweight 38. Then the continued pressure of the lever will effect elevation of the forward end of the rock frame, the pull on the cable being from the tail extension of the guard over the pulley 33 and to the frame. As the saw passes through the board, the end exposed above the board will be covered by the guard and the dust of the sawing operation will be prevented from flying into the operator's eyes and his hands will be shielded from accidental contact with the saw.

With the saw rotating and during intervals when no sawing operations are being performed, the construction provides for shielding the saw above the top face of the work table in the event of inadvertent depression of the lever and the consequent elevation of the saw, since the guard will be brought down against the table top above the slot 16 before any elevation of the saw takes place.

The invention having been described, what is claimed as new and useful is:

1. Apparatus for the purpose indicated comprising a pivotally mounted rock frame, a circular saw rotatably mounted in the end of said rock frame, a work table spanning said saw and the adjacent end of said rock frame and provided with a clearance slot for the saw, a saw guard movable toward and away from the top face of the work table and counterbalanced to normally effect movement away from the work table, a flexible connection between said saw guard and said rock frame, and a lever for effecting the elevation of the forward end of the rock frame and having a running engagement with said flexible connection.

2. Apparatus for the purpose indicated comprising a pivotally mounted rock frame, a circular saw rotatably mounted in the end of said rock frame, a work table spanning said saw and the adjacent end of said rock frame and provided with a clearance slot for the saw, a saw guard movable toward and away from the top face of the work table, a lever having a rotatably mounted sheave carried by its resistance arm, a cable connected with said saw guard and said rock frame and trained over said sheave to move the guard toward the work table and elevate the forward end of the rock frame, and a counterweight for moving the guard away from the work table.

In testimony whereof he affixes his signature.

WEB M. EDDINS.